United States Patent [19]

Iijima et al.

[11] Patent Number: 4,998,009

[45] Date of Patent: Mar. 5, 1991

[54] INFORMATION RECORDING METHOD FOR RECORDING DATA AND DIRECTORIES IN A PLURALITY OF BLOCKS COMPRISING DIVIDED RECORDING AREAS

[75] Inventors: Katsumi Iijima; Wataru Sakagami, both of Yokohama, Japan

[73] Assignee: Canon Kabushiki Kaisha, Tokyo, Japan

[21] Appl. No.: 171,863

[22] Filed: Mar. 22, 1988

[30] Foreign Application Priority Data

Mar. 31, 1987 [JP] Japan .................... 62-078021
Mar. 31, 1987 [JP] Japan .................... 62-077959

[51] Int. Cl.⁵ .................... G06K 7/10; G11B 7/007
[52] U.S. Cl. .................... 235/487; 235/454; 235/494; 369/275.3; 369/59; 369/58
[58] Field of Search ............ 235/487, 488, 494, 454, 235/456; 369/275, 47, 48, 54, 58, 59

[56] References Cited

U.S. PATENT DOCUMENTS

| 4,229,808 | 10/1980 | Hui | 369/48 |
| 4,791,622 | 12/1988 | Clay et al. | 369/54 |
| 4,791,623 | 12/1988 | Deiotte | 369/59 |
| 4,792,937 | 12/1988 | Picard | 369/59 |
| 4,811,321 | 3/1989 | Enari et al. | 369/59 |

FOREIGN PATENT DOCUMENTS

| 051305 | 5/1982 | European Pat. Off. |
| 072704 | 2/1983 | European Pat. Off. |
| 081184 | 6/1983 | European Pat. Off. |
| 251666 | 1/1988 | European Pat. Off. |
| 57-55548 | 4/1982 | Japan |
| 58-27269 | 2/1983 | Japan |
| 60-196854 | 10/1985 | Japan |
| 61-279957 | 12/1986 | Japan |
| 2156978 | 10/1985 | United Kingdom |

Primary Examiner—Stuart S. Levy
Assistant Examiner—Robert Weinhardt
Attorney, Agent, or Firm—Fitzpatrick, Cella, Harper & Scinto

[57] ABSTRACT

A method of recording information on a recording medium includes generating a plurality of blocks, each having a certain, in the recording area of the recording medium and recording data and directories for effecting the control of the data in the same block in each of the blocks.

9 Claims, 3 Drawing Sheets

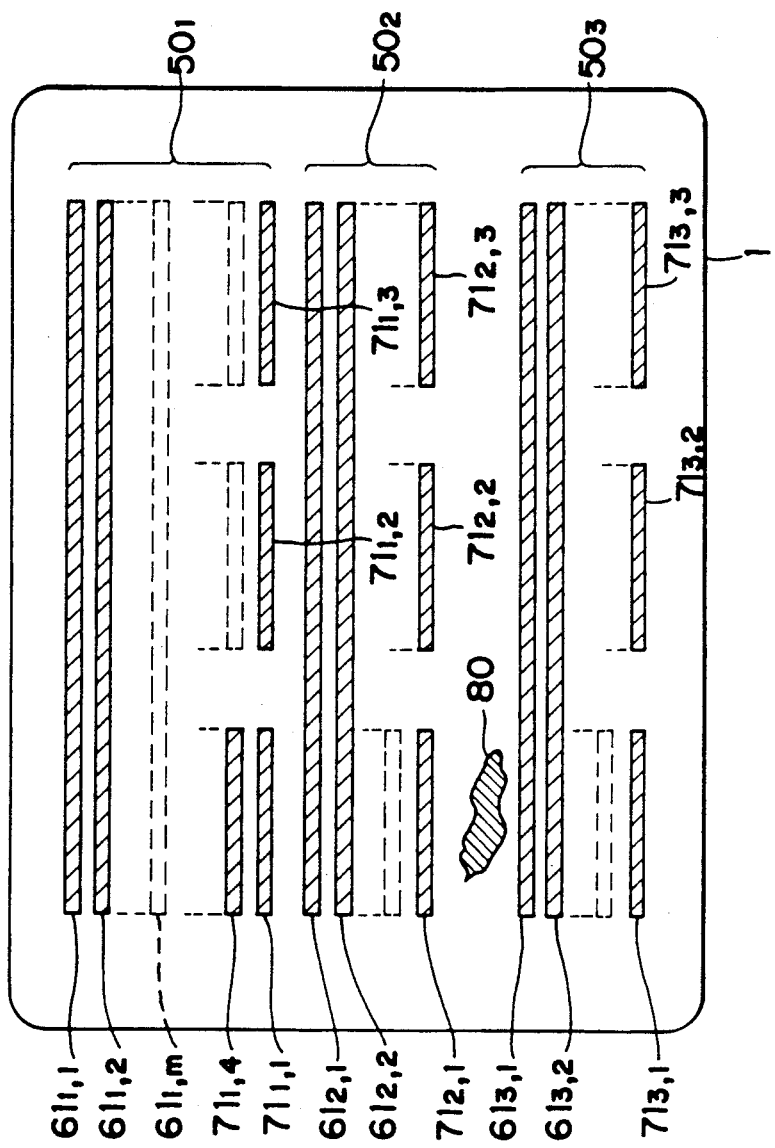

INFORMATION RECORDING METHOD FOR RECORDING DATA AND DIRECTORIES IN A PLURALITY OF BLOCKS COMPRISING DIVIDED RECORDING AREAS

BACKGROUND OF THE INVENTION

1. Field of the Invention

This invention relates to an information recording method for recording data and directories for controlling the data on a recording medium.

2. Related Background Art

A floppy disc using magnetism to effect recording and reproduction and a card-like optical information recording medium (hereinafter referred to as the optical card) using light to effect recording and reproduction are known as information recording mediums. In these information recording mediums, auxiliary data for controlling data for each type, i.e., so-called directories, are used to store a large capacity of data therein. A directory usually has written therein file information such as the name of the file, the length of the file and the head data track number, whereby file control of the data track portion is effected.

The optical card, particularly, the nonerasable postscript type optical card, has a large capacity of recording even if the dimensions thereof are the same as the size of a credit card. The dimensions of the credit card are about 85 mm × 55 mm, and when the information track pitch is 20 μm and the record length of 1 bit is 5 μm, the number of tracks is $55 \div (20 \times 10^{-3}) = 2750$, the bit capacity/track is $85 \div (5 \times 10^{-3}) = 17000$ (bits), the byte capacity/track is $17000 \div 8 = 2000$ (bytes). Accordingly, the total data capacity is $2750 \times 2000 = 5500000 = 5.5$ (M bytes).

To control such a large capacity of information, the information control technique using directories is indispensable.

FIG. 1 of the accompanying drawings a schematic plan view showing an example of such an optical card. In FIG. 1, data tracks $10_1, 10_2, \ldots, 10_n$ are recorded in the recording area of the optical card 1 in succession from one end thereof in the direction of arrow E. Each data track comprises a data portion 12 and an address portion 11 indicative of the track number. Also, directories $20_1, 20_2, 20_3, 20_4, \ldots$ for controlling said data are written in the fashion of postscript in the direction of arrow D from the other end of the recording area. Such a recording method is described in detail in Japanese Laid-Open Patent Application No. 279957/1986.

However, in the above-described recording method, the data are arranged in order of time of recording. Therefore, when reproducing these data, the necessary files (the data groups associated with one another) are not always arranged in a grouping.

Assuming, for example, that there is an information recording medium on which a certain doctor has recorded data such as electrocardiograph information and brain-wave information of a certain patient from one year of age until fifteen years of age, the electrocardiograph information and the brain-wave information at one year of age, the electrocardiograph information and the brain-wave information at two years of age, and so on are recorded on that information recording medium in the fashion of postscript. Accordingly, when the need to reproduce only the electrocardiograph information from that information recording medium occurs, access to the data file will be desultory and the access time will be long.

Also, when there is a large defect in the information recording medium and there is an area in which recording and reproduction is impossible, it is desirable to use the recording medium while avoiding that area in order to improve the recording-reproducing speed. However, in the recording method according to the prior art, there has been the problem that directories become complex to evade the defective area and the control of data becomes cumbersome.

SUMMARY OF THE INVENTION

It is an object of the present invention to solve the above-noted problem peculiar to the prior art and to provide an information recording method which enables access to be had in a short time when the recording medium is later reproduced for each individual.

It is another object of the present invention to provide a method which does not make the control of data cumbersome and in which recording of information, while avoiding defects in the medium, is possible.

The above objects of the present invention are achieved by setting a plurality of blocks each having a certain size in the recording area of a recording medium, and recording data and a directory for effecting the control of the data in the same block in each of the blocks.

BRIEF DESCRIPTION OF THE DRAWINGS

FIG. 4 is a schematic plan view of an optical card illustrating another embodiment of the present invention.

DESCRIPTION OF THE PREFERRED EMBODIMENTS

Some embodiments of the present invention will hereinafter be described in detail with reference to the drawings.

In the following description, it is to be understood that an optical card is taken as an example of the information recording medium.

Figure 1:
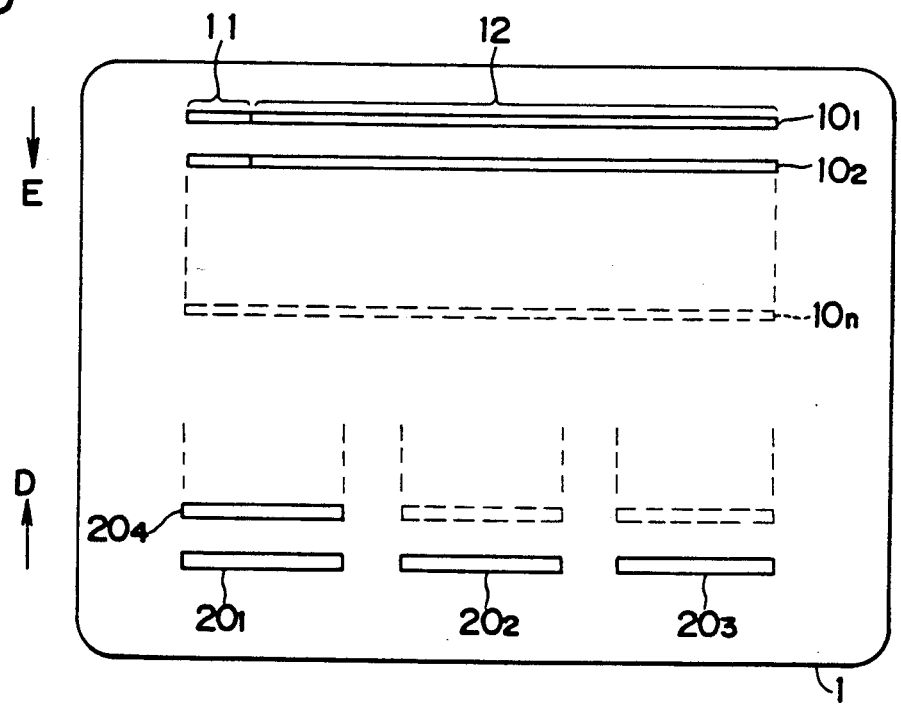
FIG. 1 is a schematic plan view of an optical card illustrating the information recording method according to the prior art.
Figure 2:
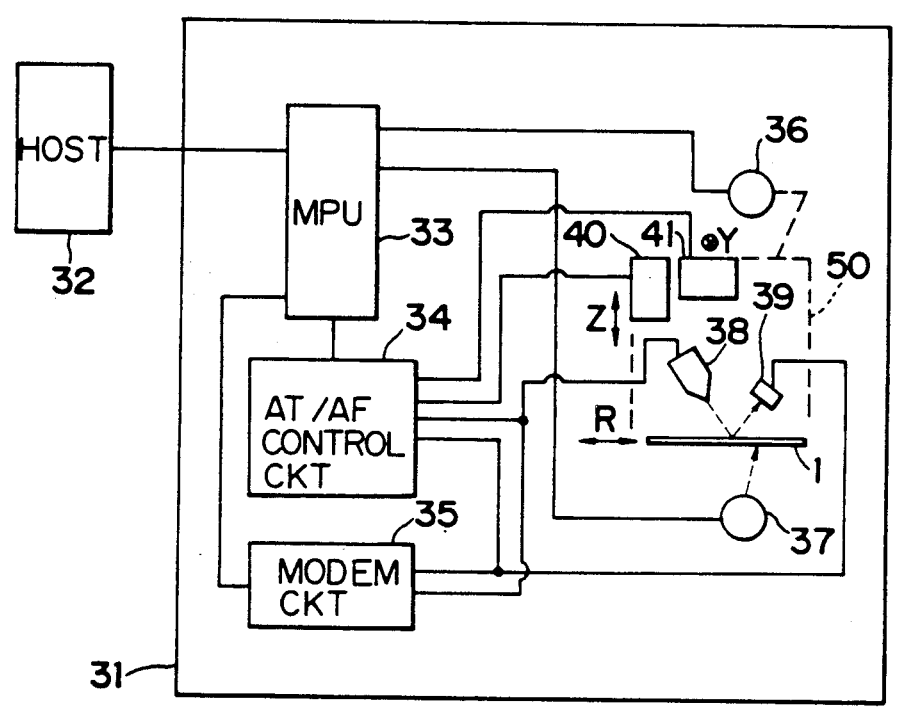
FIG. 2 is a schematic diagram of a recordingreproducing apparatus for executing the information recording method of the present invention.

First, in FIG. 2, there is shown an example of the construction of an optical card recording-reproducing apparatus which executes the information recording method of the present invention.

In FIG. 2, reference numeral 31 designates an optical card drive apparatus to which is connected a host computer 32 which is a high rank control apparatus. Reference numeral 37 denotes a motor for introducing an optical card 1 into the drive apparatus through a conveying mechanism, not shown, reciprocally moving it in the directions of bilateral arrow R by a predetermined drive and discharging it out of the apparatus. Reference numeral 38 designates a light beam applying optical system including a light source, and by this light beam applying optical system, a light beam spot is formed on the optical card during information recording and during information reproduction. Reference numeral 39 denotes a photodetector which can receive the reflected light of the light beam spot on the optical card 1. Reference numeral 40 designates an AF actuator for driving a part of the light beam applying optical system 38 to move the focused position of the light beam spot on the surface of the optical card in a direction Z, i.e., a direction perpendicular to the surface of the optical card to thereby effect autofocusing (AF), and reference numeral 41 denotes an AT actuator for driving a part of the light beam applying optical system 38 to move the light beam spot on the surface of the optical card in a direction Y (i.e., a direction orthogonal to both the direction R and the direction Z) to thereby effect auto-tracking (AT).

An optical head 50 is arranged and includes the light beam applying optical system 38, the photodetector 39, the AF actuator 40 and the AT actuator 41. Reference numeral 36 designates a drive motor for moving the optical head in the direction Y to cause the light beam spot to access a desired track on the optical card.

A micro-processing unit (MPU) 33 contains a readonly memory (ROM) and a random access memory (RAM) therein, and controls card feeding motor 37 and a head feeding motor 36 and also effects data communication, control, etc. with the host 32 by control of the host 32. An AT/AF control circuit 34 receives a signal from the photodetector 39 and drives the AF actuator 40 and the AT actuator 41. The output of the photodetector 39 is input to the AT/AF control circuit 34, and on the basis thereof, the control circuit 34 controls the AF actuator 40 and the AT actuator 41 to thereby effect AF and AT. The output of the photodetector 39 is also output to a modulating-demodulating circuit 35, whereby demodulation of read information is effected, and the demodulation signal is supplied to the MPU 33.

The modulating-demodulating circuit 35 modulates an information signal supplied thereto from the MPU 33, drives the light beam applying optical system 38 in accordance with the modulation signal, executes information recording, and demodulates the data on the basis of the signal of the photodetector 39 during reproduction. The host 32 effects transmission and reception of data with the drive apparatus 31 and records and reproduces the information of each data track on the optical card 1. Usually, the optical card has a high error rate, because of its nature as a recording medium, and requires error correcting means when information of high reliability is required.

An embodiment of the information recording method of the present invention will now be described.

Figure 3:
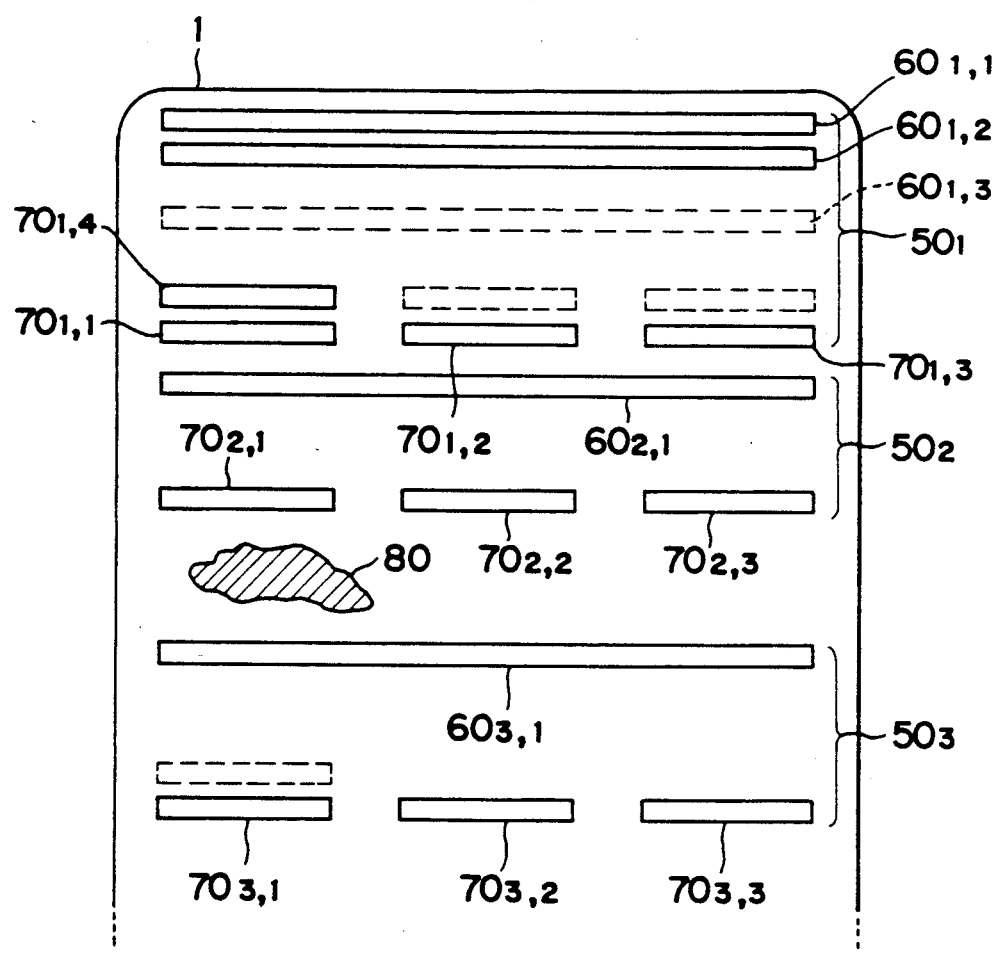
FIG. 3 is a schematic plan view of an optical card illustrating an embodiment of the information recording method of the present invention.

FIG. 3 is a schematic plan view of the optical card showing the manner in which blocks in the recording area are set.

In FIG. 3, the reference numerals $50_1$, $50_2$, $50_3$, ... designate blocks set in the recording area on the optical card 1. These blocks are of a certain size. Data tracks $60_{1,1}$, $60_{1,2}$, $60_{1,3}$, ... are recorded in the block $50_1$ in succession from one end thereof. Also, directories $70_{1,1}$, $70_{1,2}$, $70_{1,3}$, $70_{1,4}$, ... for controlling the data recorded on these data tracks are recorded in the fashion of postscript from the other end of the block $50_1$. These directories are shorter in data length than the tracks and therefore, a plurality of them are recorded on each track. Likewise, data tracks $60_{2,1}$, ... of different file and directories $70_{2,1}$, $70_{2,2}$, $70_{2,3}$, ... thereof are recorded in the block $50_2$, and data tracks $60_{3,1}$, ... and directories $70_{3,1}$, $70_{3,2}$, $70_{3,3}$, ... thereof are recorded in the block $50_3$.

In the present embodiment, as shown in FIG. 3, the data file is recorded in any one of the blocks and the directories for controlling this file are also recorded in the same block. Selection of the blocks is left to the care of one who uses this optical card 1, and upon the selection, the block used is transmitted from the host 32 in FIG. 2 to the MPU 33 in the drive apparatus 31, and the MPU 33 controls the card feeding motor 37, the head feeding motor 36, etc. within the block used. The block setting information supplied from the host 32 to the drive apparatus at this time is indicative of the position of the track on which the first directory is written and the position of the track on which the first data is written.

For example, when a doctor is to record electrocardiograph information and brain-wave information, the electrocardiograph information can be recorded in the block $50_1$ and the brain-wave information can be recorded in the block $50_2$. Accordingly, when only the electrocardiograph information is to be reproduced, shortening of the access time can be achieved well if the MPU 33 controls the card feeding motor 36 and the head feeding motor 37 only within the block $50_1$.

In the above-described embodiment, the judgment as to whether the access time can be shortened if the doctor records certain information in a certain block when he records electrocardiograph information and brain-wave information depends on how the doctor utilizes the information. Therefore, it is possible for the doctor to select the portion of the optical card which is to be used.

If the information control system of the present invention is applied to the optical card system, improvement of the information retrieving speed conforming to the information handled in various fields can be expected and wide application thereof will be possible. An example of the field to which the optical card according to the present invention can be applied is, for example, electronic publishing in the field of publishing. The object of publishing is not only character information, but also may conceivably be computer soft publishing, graphic soft publishing, etc. Also, in the field of medical treatment, the present invention can be applied to a medical card on which is recorded all necessary information for medical treatment such as personal information including a patient's address, name, age, blood type, kind of health insurance, past case history, the examination result data, the result of diagnosis, etc.

Also, in the field of public service, the present invention can be utilized for passports, driver's licence cards, lending cards in libraries, etc. Also, in the fields of service and public welfare, the present invention is applicable to various membership cards, education software, new media community cards, etc. Further, in the fields of OA and FA, the present invention is conceivably applicable to NC/robot control program cards, installation maintenance cards, service manual cards, employees' identification cards, also for use as medical examination records, students' identification cards with acquired units recorded thereon, distribution control cards, etc.

Thus, the information dealt with by the optical card of the present invention is varied, and it is anticipated that a total system of recording and reproduction is formed from both the aspect of hardware and the aspect of software conforming to the information recorded thereon. In that case, it becomes possible to provide, on an information recording member, a plurality of blocks, each having a data portion for storing a data file and a directory portion for recording thereon directory information for controlling the data file, as in the present invention, thereby improving the retrieving speed. This is because the information to be recorded in the blocks can be recorded and controlled in accordance with the form of utilization of information frequently used. For example, the information recorded on an education soft card may be questions for each grade in arithmetic, science, language and civics. If it is often the case that the user (teacher) who uses the optical card at this time deals with the questions in arithmetic, science, language and civics for each grade, the data of arithmetic, science, language and civics for a grade may be recorded in a block, and if it is often the case that the user deals with each course of study, questions in only arithmetic for every grade may be recorded in a block.

During the block setting of the present invention, design may be made such that the user can select the method of putting information in order by an icon such as a CRT in the fashion of a dialog with a computer (work station).

Also, in the present embodiment, if there is a large defect 80 in the optical card as shown in FIG. 3, the blocks can be arranged with the defect avoided. That is, if the defect 80 is discovered in advance, the directory recording start position of the block $50_2$ and the data start position of the block $50_3$ may be set at opposite sides of the defect 80.

In the above-described embodiment, the MPU stores the range of each block therein, but alternatively, marks indicative of the boundaries between the blocks may be recorded on the recording medium. If this is done, access to a wrong block will be prevented and the access time can be expected to be further shortened. An example of this will hereinafter be described.

FIG. 4 is a schematic plan view of an optical card showing another embodiment of the information recording method according to the present invention. In FIG. 4, blocks $50_1$, $50_2$ and $50_3$ of certain size are set in the recording area of the optical card 1. False data signals $61_{1,1}, 61_{1,2}, \ldots, 61_{1,m}$ and false directory signals $71_{1,1}, 71_{1,2}, 71_{1,3}, 71_{1,4}, \ldots$ are recorded on the tracks in opposite end portions, respectively, of the block $50_1$. Likewise, false data signals $61_{2,1}, 61_{2,2}, \ldots$ and false directory signals $71_{2,1}, 71_{2,2}, 71_{2,3}, \ldots$ are recorded on tracks in the opposite end portions, respectively, of the block $50_2$, and false data signals $61_{3,1}, 61_{3,2}, \ldots$ and false directory signals $71_{3,1}, 71_{3,2}, 71_{3,3}, \ldots$ are recorded on the tracks in the opposite end portions, respectively, of the block $50_3$.

The meaning of "false" is that those signals are identical to the data and directories in modulating system and data length The advantage of the use of such false signals as the marks indicative of the boundaries between the blocks is that there is no necessity of providing in the drive a special modulating circuit or the like for recording such marks and the construction for recording ordinary data can be utilized intact. The substance of the false signals may be anything such as, for example, repetition of a certain code. To discriminate a track on which the false signals are recorded from the other data tracks, a number which is not used for data may be recorded, for example, on a recording portion of the track number. Recording of the false signals is effected by the MPU 33 driving the optical head 50 in the apparatus of FIG. 2 before data is recorded after the blocks have been set by the command of the host 32. The false signals are produced by the MPU 33 and supplied to the light beam applying optical system 38 through the modulating-demodulating circuit 35. Alternatively, the false signals may be produced by an interface, not shown, which is provided between the host 32 and the MPU 33.

The data is recorded in any block subsequently to the false data signals. Also, the directory for controlling this data is recorded subsequently to the false directory signals of the same block. Selection of the blocks is left to the care of the user who uses the optical card 1. By the selection effected by the user, the information indicative of the block to be used is transmitted from the host 32 to the MPU 33 in the drive apparatus 31, and the MPU 33 controls the head feeding motor 36, etc. to move the optical head 50 to a desired block. Recording of data and directories is effected in that block.

Usually, the control of the blocks is effected by the user through the host 32, as described above. In that case, the head is moved in a direction orthogonal to the tracks by the head feeding motor 37 to thereby access a track. Whether that track is a desired track depends largely on the control accuracy and mechanical accuracy of the head feeding motor 37. Accordingly, when looking for the desired track, the execution time greatly fluctuates by these accuracies. Moreover, whether the desired track is above or below the current track on the card also poses a problem.

So, in the present embodiment, as previously described, false directories and false data are written into each block in advance before the user writes data onto the card. It is desirable that the number m of tracks on which these false signals are recorded is a number corresponding to $\pm\alpha$ tracks, i.e., $2\alpha$ or more, if the accuracy of the head feeding motor 37 is $\pm\alpha$ tracks.

Accordingly, in the present invention, when a desired block is selected and the head feeding is effected to record a data file, there are always false data or false directories. It is seen from this false information that in the case of the directories, the desired track exists in the direction D therefrom and in the case of the data, the desired track exists in the direction E therefrom.

Again in the present embodiment, as in the embodiment of FIG. 3, if there is a defect 80 shown in FIG. 4, the blocks can be set with this defect 80 avoided.

The present invention permits various applications in addition to the above-described embodiments. For example, the present invention is not restricted to recording by a light beam, but is also applicable to recording using a magnetic head. The form of the recording medium is not limited to that of a card, but may be any form, such as a disc or a tape.

The present invention covers all such applications without departing the scope thereof defined in the appended claims.

What is claimed is:

1. A method of recording information on a recording medium having a recording area, said method comprising the steps of:
   (a) generating a plurality of blocks in the recording area of the recording medium, each of the blocks having a certain size;
   (b) accessing one of the plurality of blocks based on data content;

(c) recording the data from one end portion of the selected block subsequently to any previously recorded data;

(d) recording directories for effecting control of the data from an end portion of the selected block opposite to the end portion in which the data is recorded; and (e) repeating steps (b), (c) and (d) for recording subsequent data and associated directories on selected blocks of the plurality of blocks.

2. A method according to claim 1, wherein the recording medium comprises an optical recording medium and the steps of recording the data and directories comprise applying a light beam to the medium.

3. A method according to claim 2, wherein the recording medium comprises a card.

4. A method of recording information on a recording medium having a recording area, said method comprising the steps of:

(a) generating a plurality of blocks in the recording area of the recording medium, each of the blocks each having a certain size;

(b) recording marks in boundary portions between the plurality of blocks;

(c) accessing one of the plurality of blocks based on data content;

(d) recording the data from one end portion of the selected block subsequently to any previously recorded data;

(e) recording directories for effecting control of the data from an end portion of the selected block opposite to the end portion in which the data is recorded; and (f) repeating steps (c), (d) and (e) for recording subsequent data and associated directories on selected blocks of the plurality of blocks.

5. A method according to claim 4, wherein the recording medium comprises an optical recording medium and the steps of recording the marks, data and directories comprise applying a light beam to the medium 6. A method according to claim 5, wherein the recording medium comprises a card.

7. A method of recording information on a recording medium having a recording area, said method comprising the steps of:

(a) generating a plurality of blocks in the recording area of the recording medium, each of the blocks having a certain size;

(b) recording a false data signal in one end portion of each of the plurality of blocks;

(c) recording a false directory signal in an end portion of each of the plurality of blocks opposite to the end portion in which the false data signal is recorded;

(d) accessing one of the plurality of blocks based on data content;

(d) recording a data signal in the selected block subsequently to the false data signal and subsequently to any previously recorded data signal;

(f) recording directories in the selected block for effecting control of the data subsequently to the false directory signal; and repeating steps (d), (e) and (f) for recording subsequent data and associated directories on selected blocks of the plurality of blocks.

8. A method according to claim 7, wherein the recording medium comprises an optical recording medium and the steps of recording the false data signal, false directory signal, data and directories comprise applying a light beam to the medium.

9. A method according to claim 8, wherein the recording medium comprises a card.

* * * * *

UNITED STATES PATENT AND TRADEMARK OFFICE
CERTIFICATE OF CORRECTION

PATENT NO. : 4,998,009              Page 1 of 2
DATED     : March 5, 1991
INVENTOR(S) : Katsumi Iijima, et al.

It is certified that error appears in the above-identified patent and that said Letters Patent is hereby corrected as shown below:

ON THE COVER PAGE

IN THE ABSTRACT

Line 3, "certain," should read --certain size,--.

IN THE DISCLOSURE

COLUMN 1

Line 41, "drawings a" should read --drawings is a--; and
Line 48, "said" should be deleted.

COLUMN 2

Line 11, "evade" should read --avoid--;
Line 25, "blocks" should read --blocks,--; and
Line 35, "recordingrepro-" should read --recording-repro- --.

UNITED STATES PATENT AND TRADEMARK OFFICE
CERTIFICATE OF CORRECTION

PATENT NO. : 4,998,009

DATED : March 5, 1991

INVENTOR(S) : Katsumi Iijima, et al.

Page 2 of 2

It is certified that error appears in the above-identified patent and that said Letters Patent is hereby corrected as shown below:

COLUMN 3

Line 23, "rea-" should read --read- --; and
    Line 24, "donly" should read --only--.

COLUMN 6

Line 57, "departing" should read --departing from--.

COLUMN 7

Line 23, "each" should be deleted.

COLUMN 8

Line 28, "repeating" should read --(g) repeating--.

Signed and Sealed this

First Day of September, 1992

*Attest:*

DOUGLAS B. COMER

*Attesting Officer*    *Acting Commissioner of Patents and Trademarks*